United States Patent Office 2,868,786
Patented Jan. 13, 1959

2,868,786

ESTERS OF PHENYL ACETIC ACIDS AND A PROCESS OF MAKING SAME

Harm Siemer and Fritz Kurzen, Konstanz, and Adolf Doppstadt, Litzelstetten, near Konstanz, Germany, assignors to Ravensberg G. m. b. H., Chemische Fabrik, Konstanz, Germany, a corporation of Germany No Drawing. Application December 21, 1955
Serial No. 554,389

Claims priority, application Germany December 27, 1954

5 Claims. (Cl. 260—247.2)

The present invention relates to new esters of acids of the phenyl acetic acid series and more particularly to new esters of acids of the phenyl acetic series with tetrahydro-1,4-oxazine-N-ethanol compounds, and to a process of making same.

It is one object of the present invention to provide new and valuable esters of acids of the phenyl acetic acid series with tetrahydro-1,4-oxazine-N-ethanol compounds which new esters are useful for a number of purposes.

Another object of the present invention is to provide new and valuable acid addition salts of such esters of acids of the phenyl acetic acid series with tetrahydro-1,4-oxazine-N-ethanol compounds.

Still another object of the present invention is to provide a simple, economical, and effective process of producing the new esters of acids of the phenyl acetic acid series with tetrahydro-1,4-oxazine-N-ethanol compounds which process permits the production of said new esters in a high yield.

Other objects of the present invention and advantageous features thereof will become apparent as the description proceeds:

In principle, the new esters and their acid addition salts are derived from phenyl acetic acids of the following formula I:

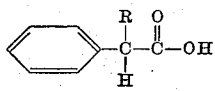

In said formula R indicates an alkyl radical and more particularly an alkyl radical with 1 to 5 carbon atoms.

The alcohol component of the new esters according to the present invention is derived from tetrahydro-1,4-oxazine-N-ethanol compounds of the following Formula II:

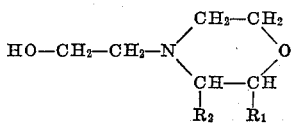

In said formula $R_1$ indicates an aryl radical which may also be substituted, and more particularly a phenyl radical, and $R_2$ indicates an alkyl radical and more particularly an alkyl radical with 1 to 5 carbon atoms.

The resulting new esters of Formula III:

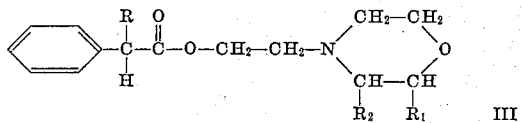

in which formula R, $R_1$, and $R_2$ indicate the same substituents as given above, are obtained by esterifying a phenyl acetic acid of Formula I with a tetrahydro-1,4-oxazine-N-ethanol of Formula II. For instance, the acid halogenides and more particularly the acid chlorides of phenyl acetic acids of Formula I, such as α-phenyl-α-ethyl acetic acid chloride, are reacted with tetrahydro-1,4-oxazine-N-ethanol compounds of Formula II, for instance, with 2-phenyl-3-methyl-4-ethanol tetrahydro-1,4-oxazine, advantageously in a suitable solvent, such as anhydrous toluene, and preferably at elevated temperature, and converting the resulting ester hydrohalogenides into the corresponding bases. The yield is between about 90% and about 95%. When using, for instance, the above mentioned reactants, α-phenyl-α-ethyl acetic acid-(2-phenyl-3-methyl tetrahydro-1,4-oxazine)-N-ethyl ester is obtained in an excellent yield.

According to another embodiment of the present invention there can also be used as the one reaction component, in place of the acid halogenides of phenyl acetic acids of Formula I, esters of said acids with lower alcohols, for instance, α-phenyl-α-ethyl acetic acid methyl ester. Reaction of such esters with tetrahydro-1,4-oxazine compounds according to Formula II in the presence of a suitable catalyst such as sodium methylate, yields the free ester bases of Formula III.

The new esters represent valuable compounds which are useful for many purposes. They have, for instance, a satisfactory insect repellent and especially mosquito repellent property. They are effective preserving agents, for instance, in lacquer coatings and the like. They have interesting physiological properties and possess, for instance, an antidepressive and stimulating activity which is similar but superior to that of caffeine. They have also a marked appetite depressing activity.

The following examples serve to illustrate the invention.

Example 1

1105 g. of 2-phenyl-3-methyl-4-ethoxy tetrahydro-1,4-oxazine are dissolved in 4000 cc. of anhydrous toluene. 910 g. of α-phenyl-α-ethyl acetic acid chloride are dissolved in 400 cc. of anhydrous toluene and the resulting solution is slowly added to the heated solution of the tetrahydro-1,4-oxazine compound. The mixture is then heated to boiling for about 5 hours. About 1000 g. of ice are added to the cooled reaction mixture which is then rendered alkaline by the addition of 20% sodium carbonate solution to a pH of 9.0. Thereafter the mixture is vigorously stirred by means of a turbine mixer for one hour and the toluene phase is separated. The toluene solution is washed with 1000 cc. of saturated sodium chloride solution and is dried over anhydrous sodium sulfate. The toluene is then evaporated and the residue is subjected to high vacuum distillation. 1650 g. of α-phenyl-α-ethyl acetic acid-(2-phenyl-3-methyl tetrahydro-1,4-oxazine)-N-ethyl ester, boiling at 235–240° C./0.05 mm., are obtained thereby in a yield of 90.5% of the theoretical yield.

The hydrochloride of said basic ester is prepared by dissolving the ester in ether and passing anhydrous hydrochloric acid into the ethereal solution. Its melting point is 148–150° C.

Example 2

63.6 g. of 2-phenyl-3-methyl-4-ethoxy tetrahydro-1,4-oxazine and 38.4 g. of α-phenyl-α-ethyl acetic acid methyl ester are heated to boiling for 6 hours, while stirring, in 45 cc. of anhydrous methanol to which 10 cc. of a sodium methylate solution in methanol containing 0.65 g. of sodium metal are added. Thereafter, methanol is distilled off while continuing stirring and heating to a temperature of 250° C. and the remaining reaction mixture is heated at 250° C. for 6 more hours while stirring. Ice water is added to the cooled reaction product, the mixture is rendered alkaline by the addition of potassium carbonate, and is extracted with ether. The ethereal solution is washed with saturated sodium chloride solution until it is of neutral reaction, and is dried over anhydrous sodium sulfate. The ether is then evaporated and the residue is distilled in a vacuum. 76 g. of α-phenyl-α-ethyl acetic acid-(2-phenyl-3-methyl tetrahydro-1,4-oxazine)-N-ethyl ester of the boiling point 232–238° C./0.05 mm. are obtained thereby.

Said ester base is converted into its hydrochloride in the same manner as described hereinabove in Example 1.

In place of α-phenyl-α-ethyl acetic acid chloride used in Example 1 or of the corresponding methyl ester used in Example 2 as the one reaction component, there can be employed equimolecular amounts of other phenyl acetic acid halogenide or ester compounds while otherwise the procedure is the same as described in said Example 1. Such halogenides or esters are, for instance, the halogenides or esters of the following acids:

Hydratropic acid (2-phenyl propionic acid),
2-phenyl pentanoic acid,
α-Phenyl-α-(4-pyridine) acetic acid, and others.

In place of the hydrochloride there can be produced other acid addition salts of the new ester bases, such as the hydrobromides, sulfates, phosphates, nitrates as well as acid addition salts with organic acids, such as salts with acetic acid, propionic acid, malonic acid, maleic acid, citric acid, succinic acid, malic acid, tartaric acid, benzoic acid, salicylic acid, nicotinic acid, isonicotinic acid, and others.

Of course, many changes and variations in the starting materials, the solvents and catalysts used, the reaction conditions, temperature, and duration, the methods of working up the reaction mixture and of isolating and purifying the resulting ester bases and of converting such bases into their acid addition salts, and the like may be made by those skilled in the art in accordance with the principles set forth herein and in the claims annexed hereto.

We claim:

1. α-Phenyl-α-ethyl acetic acid-(2-phenyl-3-methyl tetrahydro-1,4-oxazine)-N-ethyl ester.

2. The hydrochloride of α-phenyl-α-ethyl acetic acid-(2-phenyl-3-methyl tetrahydro-1,4-oxazine)-N-ethyl ester.

3. In a process of producing α-phenyl-α-ethyl acetic acid-(2-phenyl-3-methyl tetrahydro-1,4-oxazine)-N-ethyl ester, the steps comprising adding a solution of α-phenyl-α-ethyl acetic acid chloride in toluene to a heated solution of (2-phenyl-3-methyl tetrahydro-1,4-oxazine)-N-ethanol in toluene, heating the reaction mixture to boiling until esterification is completed, cooling the reaction mixture, adding ice to the cooled reaction mixture, alkalizing the mixture by the addition of sodium carbonate solution to a pH of 9.0, separating the toluene solution from the aqueous phase, evaporating the toluene, and subjecting the evaporation residue to high vacuum distillation to isolate the resulting α-phenyl-α-ethyl acetic acid-(2-phenyl-3-methyl tetrahydro-1,4-oxazine)-N-ethyl ester.

4. In a process of producing α-phenyl-α-ethyl acetic acid-(2-phenyl-3-methyl tetrahydro-1,4-oxazine)-N-ethyl ester, the steps comprising heating to boiling (2-phenyl-3-methyl tetrahydro-1,4-oxazine)-N-ethanol and α-phenyl-α-ethyl acetic acid methyl ester in methanol with the addition of sodium methylate for several hours while stirring, distilling off the methanol, increasing the temperature to about 250° C., heating the reaction mixture at about 250° C. until interchange of the alcohol radicals is substantially completed, adding ice water to the cooled reaction product, alkalizing the mixture by the addition of potassium carbonate solution, extracting the resulting ester base by means of ether, separating the ethereal extract from the aqueous phase, evaporating the ether, and subjecting the evaporation residue to high vacuum distillation to isolate the resulting α-phenyl-α-ethyl acetic acid-(2-phenyl-3-methyl tetrahydro-1,4-oxazine)-N-ethyl ester.

5. The compounds selected from the group consisting of esters of phenyl acetic acids with tetrahydro-1,4-oxazine-N-ethanol compounds and their acid addition salts, said esters corresponding to the formula

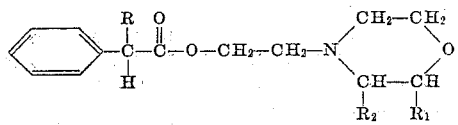

wherein

R indicates a lower alkyl radical with 1 to 5 carbon atoms;

$R_1$ indicates a phenyl radical; and $R_2$ indicates a lower alkyl radical with 1 to 5 carbon atoms.

References Cited in the file of this patent
UNITED STATES PATENTS

| | | |
|---|---|---|
| 2,447,395 | Cheney et al. | Aug. 17, 1948 |
| 2,475,852 | Northey et al. | July 12, 1949 |
| 2,538,794 | Moffett et al. | Jan. 23, 1951 |